Patented May 5, 1931

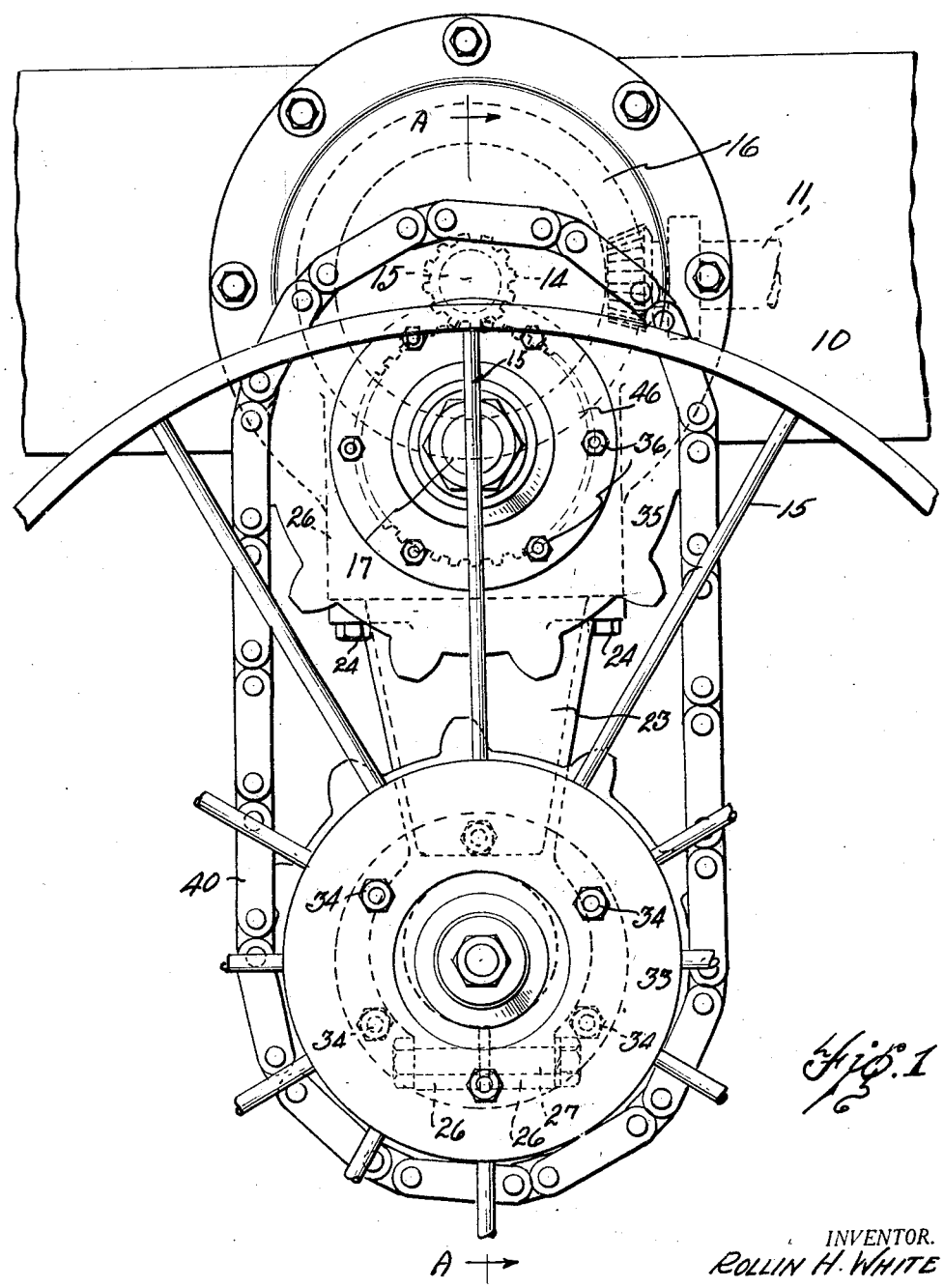

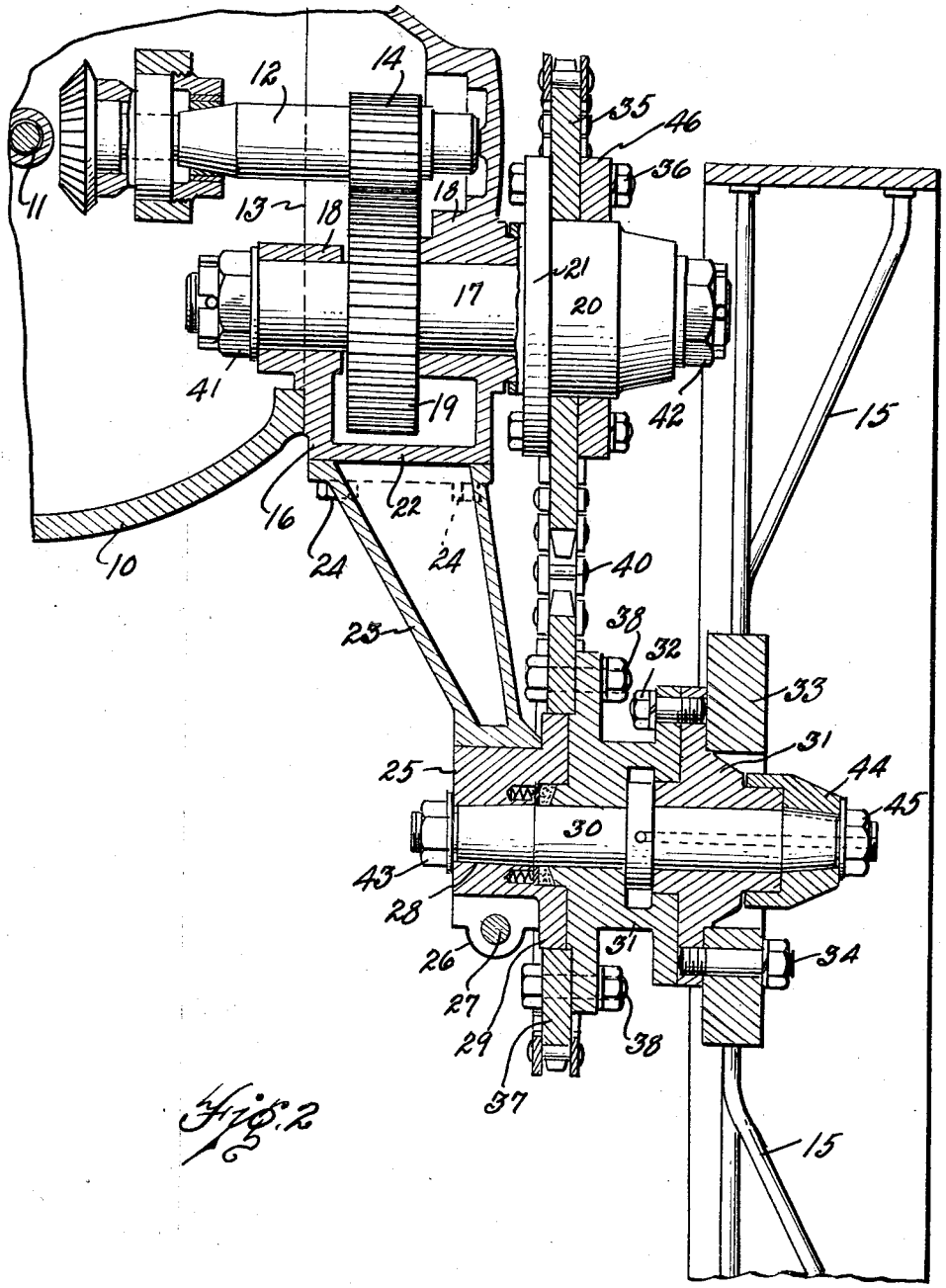

1,803,447

UNITED STATES PATENT OFFICE

ROLLIN H. WHITE, OF CLEVELAND HEIGHTS, OHIO

EXTENSION SUPPORT AND DRIVING MEANS FOR TRACTORS

Application filed September 27, 1928. Serial No. 308,773.

This invention relates to tractors, and more particularly to an extension support and driving mechanism for traction wheels.

An object of my invention is to provide a support and drive means which can be applied to a tractor for supporting and driving the traction wheels in a plane below that normally provided, so that the vertical clearance of the main frame can be varied for different kinds of work.

Another object of my invention is to provide an auxiliary support and drive mechanism for the traction wheels of a tractor which can be readily applied and removed, the wheel structures being the only part of the tractor assembly which has to be disturbed.

A further object of my invention is to provide a novel form of adjustment for the chain tension of an extension drive for tractors.

These and other objects will be more fully pointed out in the following description taken with the accompanying drawings illustrating an embodiment of my invention.

In the drawings, Fig. 1 is a side elevation of a portion of a tractor having my invention associated therewith; and Fig. 2 is a section of the same taken on line A—A of Fig. 1.

Referring now to the drawings by characters of reference, 10 illustrates a transmission casing of a tractor which forms an intermediate section of the longitudinally extending main frame. The tractor is, preferably, of the two wheel type, and as the wheel supports and driving mechanisms arranged on opposite sides of the casing are similar only one has been shown. A propeller shaft 11, driven from the usual motive power and extending into the transmission gear casing, is connected through differential gearing (not shown) with one of the drive shafts 12. The side of the casing is provided with an opening 13 through which one end of the drive shaft extends, and a gear 14 is secured to the projecting end of such shaft.

Associated with the transmission casing, for enclosing the opening in the casing and the end of the drive shaft, and for supporting the traction wheel 15 and carrying the driving mechanism, I provide a hollow housing 16 preferably formed as an integral cast member. A driving axle 17 extends through the housing 16 and is supported therein in bearings 18, such axle being arranged to extend in parallel relation with the drive shaft. A gear 19 is secured upon the axle 17 and is arranged to mesh with the gear 14. A hub section 20 is fixed to the driving axle and is provided with a flange portion 21, such hub structure being adapted to carry the wheel 15 when only a minimum clearance is required between the tractor body and the ground.

For certain classes of work, such as plowing and orchard cultivation, it is desirable that the clearance between the tractor frame and the ground should be small, and in such event the wheel 15 can be mounted upon and secured to the hub section 20. There are certain other classes of work where such minimum vertical clearance will not permit the use of the tractor, such for instance as the cultivation of cotton and corn when straddling of the plants is required. In order to permit the use of the tractor above described, when a high clearance is necessary or desirable, I provide an auxiliary support and drive mechanism which can be readily attached and removed.

To this end the main support casting 16 is provided with a flat base 22 to which a bracket 23 is detachably secured by studs 24. The lower end of the bracket is formed to provide a housing for a bearing member 25 which is adjustably clamped therein, the wall of the housing being split and the free ends being formed with flanges 26 which are drawn toward each other by bolts 27. The bearing 25 is formed with a bore 28 extending eccentrically of the axis thereof and with a flanged portion 29. A wheel carrying axle 30 extends through the eccentric bore in the bearing 25 and is supported thereby. A hub member formed of two sections 31, secured together by studs 32, is rotatably mounted on the wheel carrying axle 30, and the wheel hub 33 is removably secured to the hub section 31 by studs and nuts 34.

The wheel is normally detachably secured to the hub flange 21 in the same manner as it is attached to the hub section 31 and can be readily removed for use, as shown, when desired. When the wheel is removed from the hub section 20, a sprocket wheel 35 is positioned on the hub section 20 and detachably secured to the flange 21 by the bolts 36 which extend through a retainer ring 46. A similar sprocket wheel 37 is secured to one of the hub sections 31 by bolts 38, and a drive chain 40 is arranged to encircle the sprocket wheels 35 and 37, and provide with the sprockets a driving connection between the hub section 20 keyed to the axle 17 and the hub section 31 carrying the traction wheel.

The axle 17 is secured against endwise displacement from the housing at each end by securing means 41 and 42. The axle 29 is also secured against endwise displacement by a nut 43 at one end and a cap member 44 at the other end which is secured in position by a nut 45. The extension drive and supporting means can be readily attached and removed from the tractor. Further, the wheel can be readily attached to and removed from the drive shaft 17 and the shaft 30.

The bore, in the bearing 25 which receives the shaft 30, is eccentrically arranged so that the bearing can be rotated to vary the distance between the sprockets 37 and 35. Such adjustment can be readily made by loosening the bolt 27 and rotating the bearing 25 until the chain 40 is in desired driving extension. It will be seen that the chain can thus be readily tightened as desired.

Various changes can be made in the details of construction described without departing from the spirit of my invention or the scope of what is claimed.

What I claim is.

1. In a tractor, the combination with a transmission housing having a driven shaft projecting therefrom, of an auxiliary traction extension comprising a traction wheel hub secured to the projecing end of said shaft, a sprocket detachably secured to said wheel hub, a depending bracket detachably secured to the base of said transmission housing, a fixed axle carried by said bracket, a rotatable hub carried by said fixed axle, a sprocket secured to said rotatable hub, a drive chain encircling said sprockets, and a traction wheel secured to said rotatable hub.

2. In a tractor, the combination with a transmission housing having a driven shaft and traction hub projecting therefrom, of an auxiliary extension supporting and driving structure comprising a drive sprocket detachably secured to said wheel hub, a depending bracket detachably secured to the base of said transmission housing, a fixed axle carried by said bracket, a rotatable hub carried by said fixed axle, a driven sprocket secured to said rotatable hub, a drive chain encircling said sprockets, and a traction wheel detachably secured to said rotatable hub, said wheel being adapted to be fixed to the hub on said driven shaft when said drive sprocket is detached.

3. In a tractor, the combination with a transmission housing and a driven tractor wheel hub, of an auxiliary extension wheel support and driving mechanism comprising a sprocket detachably secured to said driven hub, a depending bracket detachably secured to said housing, a tractor wheel, means carried by said bracket for driving and receiving a wheel, and a drive chain connecting said sprocket with said wheel driving means.

4. In a tractor, the combination with a transmission case, a drive axle projecting from the sides of the case, traction wheel hubs fixed to the projecting axle ends, of an auxiliary extension traction structure associated with each side of the case each comprising a depending bracket detachably secured to the case, an axle fixed to the bracket, a hub rotatably mounted on the axle, a drive sprocket fixed to one side of the rotatable hub in a vertical plane with the traction wheel hub on the same side of the case, a traction wheel fixed to the rotatable hub, and a driving connection between the sprocket and aligned hub.

In testimony whereof I hereunto affix my signature.

ROLLIN H. WHITE.